(12) United States Patent
Polonsky et al.

(10) Patent No.: US 11,054,507 B2
(45) Date of Patent: Jul. 6, 2021

(54) METHOD FOR DETECTING OBJECT AND ELECTRONIC DEVICE THEREOF

(71) Applicant: Samsung Electronics Co., Ltd., Suwon-si (KR)

(72) Inventors: Stanislav Vladimirovich Polonsky, Moscow (RU); Artem Yurievich Nikishov, Kolomna (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 509 days.

(21) Appl. No.: 15/901,500

(22) Filed: Feb. 21, 2018

(65) Prior Publication Data

US 2018/0267149 A1    Sep. 20, 2018

(30) Foreign Application Priority Data

Mar. 15, 2017  (RU) .......................... RU2017108632
Feb. 7, 2018  (KR) ........................ 10-2018-0015043

(51) Int. Cl.
| | | |
|---|---|---|
| *G01C 3/08* | (2006.01) | |
| *G01S 7/481* | (2006.01) | |
| *G02B 26/10* | (2006.01) | |
| *H02N 15/00* | (2006.01) | |
| *G01S 17/08* | (2006.01) | |

(Continued)

(52) U.S. Cl.
CPC ............ *G01S 7/4817* (2013.01); *G01S 17/04* (2020.01); *G01S 17/08* (2013.01); *G01S 17/42* (2013.01); *G01S 17/931* (2020.01); *G02B 26/101* (2013.01); *G02B 26/105* (2013.01); *H02N 15/00* (2013.01)

(58) Field of Classification Search
CPC ........ G01S 17/931; G01S 17/08; G01S 17/04; G01S 17/42; G01S 7/4817; G02B 26/101; G02B 26/105; H02N 15/00
USPC ........................................................ 356/5.01
See application file for complete search history.

(56) References Cited

U.S. PATENT DOCUMENTS

| | | |
|---|---|---|
| 5,267,091 A | 11/1993 | Chen |
| 5,455,706 A | 10/1995 | Brotz |

(Continued)

FOREIGN PATENT DOCUMENTS

| | | |
|---|---|---|
| CN | 102944933 A1 | 2/2013 |
| EP | 2189834 A1 | 5/2010 |
| JP | 2012068309 A1 | 4/2012 |

OTHER PUBLICATIONS

Russian Search Report dated Dec. 7, 2017 issued in Russian Application No. 2017108632.

(Continued)

*Primary Examiner* — Mark Hellner
(74) *Attorney, Agent, or Firm* — Jefferson IP Law, LLP

(57) ABSTRACT

Object detection and distance measurement using a scanning device is provided. The beam deflection device for light detection and ranging (LiDAR) includes a base, permanent magnets, a maglev reflector attached to the permanent magnets, and control coils mounted on the base. The maglev reflector may be configured to levitate due to an electromagnetic interaction of the permanent magnets and the control coils, and the control coils may consist of horizontal (H)-control coils defining a position of the maglev reflector in a horizontal direction and vertical (V)-control coils defining a position of the maglev reflector in a vertical direction.

19 Claims, 20 Drawing Sheets

(51) Int. Cl.
*G01S 17/42* (2006.01)
*G01S 17/04* (2020.01)
*G01S 17/931* (2020.01)

(56) References Cited

U.S. PATENT DOCUMENTS

| | | | | |
|---|---|---|---|---|
| 5,684,616 | A | * | 11/1997 | Brotz .................... G02B 30/54 |
| | | | | 359/198.1 |
| 6,583,863 | B1 | | 6/2003 | Smith |
| 7,002,669 | B2 | | 2/2006 | Frick |
| 7,545,485 | B2 | | 6/2009 | Okada et al. |
| 7,969,558 | B2 | | 6/2011 | Hall |
| 8,203,702 | B1 | | 6/2012 | Kane et al. |
| 8,767,190 | B2 | | 7/2014 | Hall |
| 9,063,549 | B1 | | 6/2015 | Pennecot et al. |
| 2002/0143252 | A1 | | 10/2002 | Dunne et al. |
| 2010/0053715 | A1 | | 3/2010 | O'Neill et al. |
| 2010/0073750 | A1 | * | 3/2010 | Yamaguchi ........... G01S 7/4816 |
| | | | | 359/200.7 |
| 2013/0207970 | A1 | * | 8/2013 | Shpunt .................. G01S 7/4868 |
| | | | | 345/419 |
| 2013/0241762 | A1 | | 9/2013 | Smith et al. |
| 2014/0021324 | A1 | | 1/2014 | Schumacher et al. |
| 2014/0085622 | A1 | | 3/2014 | Wong |
| 2014/0247440 | A1 | * | 9/2014 | Yamada .................. G01S 17/06 |
| | | | | 356/5.01 |
| 2016/0291134 | A1 | | 10/2016 | Droz et al. |

OTHER PUBLICATIONS

International Search Report dated Jun. 20, 2018, issued in International Application No. PCT/KR2018/002550.
Russian Office Action dated Mar. 29, 2018, issued in Russian Application No. 2017108632/28(015041).
Extended European Search Report dated Jan. 2, 2020, issued in European Application No. 18768656.3-1206.

* cited by examiner

METHOD FOR DETECTING OBJECT AND ELECTRONIC DEVICE THEREOF

CROSS-REFERENCE TO RELATED APPLICATION(S)

This application claims the benefit under 35 U.S.C. § 119(a) of a Russian patent application filed on Mar. 15, 2017 in the Russian Intellectual Property Office and assigned Serial number 2017108632, and a Korean patent application filed on Feb. 7, 2018 in the Korean Intellectual Property Office and assigned Serial number 10-2018-0015043, the entire disclosures of each of which are hereby incorporated by reference.

TECHNICAL FIELD

The present disclosure relates to a method for detecting an object, and an electronic device thereof.

BACKGROUND

Light detection and ranging (LiDAR) is a remote sensing technology that measures a distance by illuminating a target with a laser light and analyzing the reflected light. For example, for navigation of autonomous ground vehicles, the LiDAR is one of the main instrument to detect obstacles, collect 3-dimension (3D) mobile data, and generate a 3D map. However, a typical scanning device using the LiDAR technology has shortcomings such as a large size, a manual adjustment of a rotating device, a high complexity due to a large number of light sources and receivers.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for effectively detecting an object, and an electronic device thereof.

Another aspect the present disclosure is to provide a method for detecting an object by using a device having a relatively less complex structure, and an electronic device thereof.

Another aspect the present disclosure is to provide a method for detecting an object by using a light source and a reflector, and an electronic device thereof.

In accordance with an aspect of the present disclosure, an electronic device is provided. The electronic device includes a transmitter configured to emit light beams, a reflector configured to reflect the light beams, an actuator configured to steer the light beams towards an external object by controlling a direction and angle of an inclination of the reflector, a receiver configured to receive the light beams reflected from the external object through the reflector, and at least one processor configured to detect the external object by using the received reflected light beams.

In accordance with another aspect of the present disclosure, a method of operating an electronic device is provided. The method includes emitting light beams, steering the light beams towards an external object by controlling a direction and angle of an inclination of a reflector, receiving the light beams reflected from the external object through the reflector, and detecting the external object by using the received reflected light beams.

In accordance with another aspect of the present disclosure, a beam deflection system for light detection and ranging (LiDAR) is provided. Said system is based on maglev (magnetic levitation) reflector (mirror) levitating in magnetic field with 6 degrees of freedom (DoF) control. The beam deflection system includes a base, permanent magnets, a maglev reflector attached to the permanent magnets, and control coils mounted on the base. The top side of the maglev reflector is covered by material that can reflect light beam. Position of every permanent magnet in the space is defined by electromagnetic interaction between the magnet and control coils that supplied by current. The maglev reflector is configured to levitate due to said electromagnetic interaction of permanent magnets and control coils. Control coils comprise H-control coils (horizontal control coils) defining position of the maglev reflector in horizontal direction and V-control coils (vertical control coils) defining position of the maglev reflector in vertical direction. Said control coils substantially are electromagnets.

In accordance with another aspect of the present disclosure, a scanning system is provided. The scanning system includes the above mentioned beam deflection system, a light source, configured to emit light beam towards the reflector, and a receiver, configured to receive the reflected beam from the reflector. For example, a laser or light emitting diode (LED) can be used as the light source.

In accordance with another aspect of the present disclosure, a LiDAR system is provided. The LiDAR system includes the above mentioned scanning system and a processing unit configured to analyze results of operation of the scanning system to detect objects and to estimate the distance to said detected objects.

In accordance with another aspect of the present disclosure, a method for detecting an object and measuring distance to said object using the above mentioned LiDAR system is provided. The method includes steps of emitting a light beam to a reflector by a light source, defining a direction of the light beam by controlling a position and inclination angle of the reflector, receiving the beam reflected by the object, estimating a time interval from emission time to reception time of the beam and calculating a distance to said object based on said estimation result.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A hardware-based access method is described for example in the various embodiments of the present disclosure described hereinafter. However, since the various embodiments of the present disclosure include a technique in which hardware and software are both used, a software-based access method is not excluded in the various embodiments of the present disclosure.

Hereinafter, the present disclosure relates to a method for detecting an object and an electronic device thereof. Specifically, the present disclosure describes a technique for detecting an object by using a light controlled by the use of a reflector.

A term indicating a signal, a term indicating a constitutional element of a device, or the like used in the following description is for purposes only. Therefore, the present disclosure is not limited to terms described below, and thus other terms having the same technical meaning may also be used.

Figure 1:
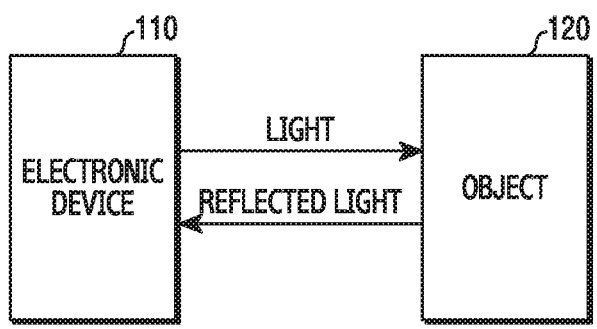
FIG. 1 illustrates an example of an environment in which an electronic device operates according to an embodiment of the present disclosure.

FIG. 1 illustrates an example of an environment in which an electronic device operates according to an embodiment of the present disclosure.

Referring to FIG. 1, an electronic device 110 emits a light in at least one direction, and receives a light reflected from an object 120. In addition, the electronic device 110 may determine a distance to the object 120, a shape, or the like based on the reflected light. For example, the electronic device 110 may detect the object 120 by using a time of emitting the light and a time of receiving the reflected light. Herein, the light may be referred to as a 'ray', a 'light beam', a 'beam', or other terms having the same technical meanings. In addition, the electronic device 110 may be referred to as a 'scanning device', a 'light detection and ranging (LiDAR) device', or other terms having the same technical meanings.

Figure 2:
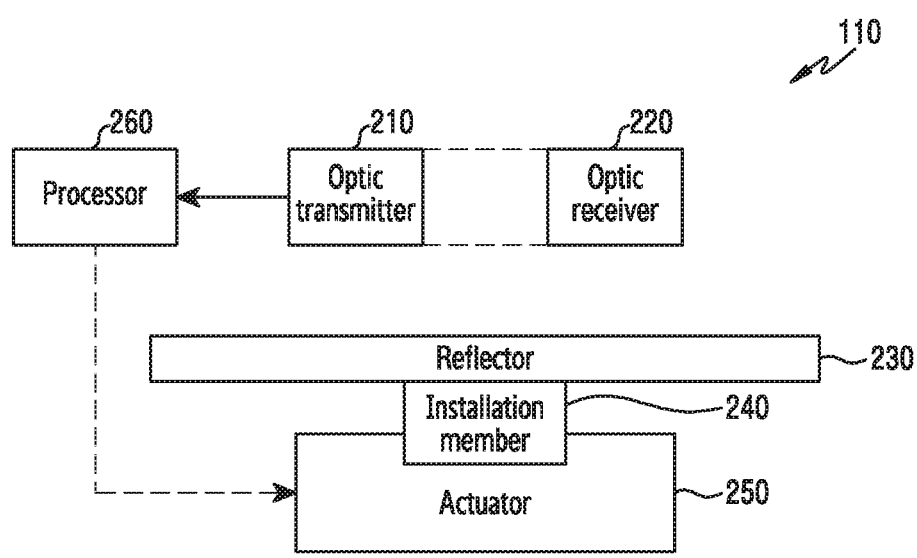
FIG. 2 illustrates a structure of an electronic device according to an embodiment of the present disclosure.

FIG. 2 illustrates a structure of the electronic device 110 according to various an embodiment of the present disclosure.

The structure exemplified in FIG. 2 may be understood as the structure of the electronic device 110. Hereinafter, the term ' . . . unit', ' . . . device', or the like implies a unit of processing at least one function or operation, and may be implemented in hardware or software or in combination of the hardware and the software.

Referring to FIG. 2, the electronic device 110 includes an optic transmitter 210, an optic receiver 220, a reflector 230, an installation member 240, an actuator 250, and a processor 260.

The optic transmitter 210 emits an initial light to the reflector 230, and the optic receiver 220 receives a light reflected from an object (e.g., the object 120) to be detected. In this case, the initial light may reach the object after being reflected from the reflector 230, and the reflected light may be received by the optic receiver 220 after being reflected from the reflector 230. The optic transmitter 210 may include a laser transmitter or a light emitting diode (LED).

A light source generated by the optic transmitter 210 may vary depending on desired light characteristics. The optic receiver 220 may include an avalanche photodiode.

The reflector 230 reflects the initial light emitted from the optic transmitter 210 and the light reflected from the object. The reflector 230 may be tilted or rotated due to the installation member 240 and the actuator 250. At least one side of the reflector 230 is formed of a material that can reflect the light. For example, a top side of the reflector 230 may be covered by the material that can reflect the light.

The installation member 240 connects the reflector 230 and the actuator 250. The installation member 240 may be implemented by sticking, threaded connection, or another suitable attachment means. The actuator 250 controls a direction and angle of an inclination of the reflector 230. For this, the actuator 250 has a function for applying a physical force to the reflector 230. According to various embodiments, the actuator 250 may control the direction and angle of the inclination of the reflector 230 depending on a contact type or a non-contact type.

The processor 260 controls the optic transmitter 210, the optic receiver 220, and the actuator 250. For example, the processor 260 may control a frequency in use for the light transmitted from the optic transmitter 210, provide a signal for controlling the inclination of the reflector 230 to the actuator 250, and perform an arithmetic operation for detecting the object by using information regarding the reflected light provided from the optic receiver 220. According to an embodiment, the processor 260 may calculate a time interval between a time of emitting the initial lights and a time of receiving the reflected lights.

Figure 3:
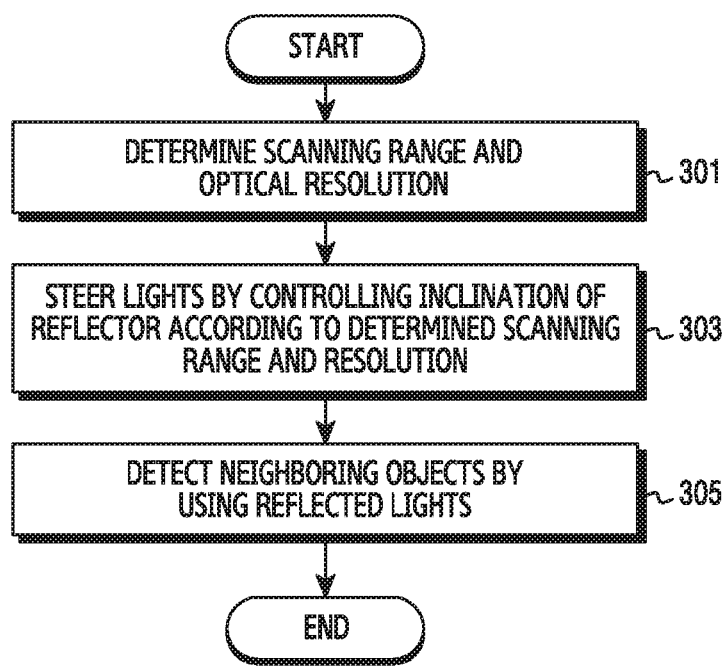
FIG. 3 is a flowchart illustrating an electronic device according to an embodiment of the present disclosure.

FIG. 3 is a flowchart illustrating an electronic device according to an embodiment of the present disclosure. A method of operating the electronic device 110 is exemplified in FIG. 3.

Referring to FIG. 3, in operation 301, the electronic device determines a scanning range and an optical resolution. Herein, the scanning range may be defined as a direction and an angle with respect to the direction as a physical region to which lights will be emitted. The scanning range may be referred to as a 'field-of-view' or other terms having the same meaning. The optical resolution may be expressed as an angle formed by lights adjacent to each other, and may include one angle value or a plurality of angle values (e.g., a vertical angle and a horizontal angle). However, according to another embodiment, the scanning range and the resolution may be predefined, and in this case, operation 301 may be skipped.

In operation 303, the electronic device steers the lights by controlling an inclination of a reflector according to the determined range and resolution. For example, the electronic device emits the lights by using an optic transmitter (e.g., the optic transmitter 210), and reflects the emitted lights by using the reflector (e.g., the reflector 230). In this case, the electronic device may adjust an inclination angle of the reflector by using an actuator (e.g., the actuator 250), and may steer the light in an intended direction by adjusting the inclination angle. That is, the electronic device may adjust the direction and angle of the inclination of the reflector according to the scanning range determined in operation 301, and may adjust a speed of emitting the lights and a speed of controlling the reflector according to the resolution determined in operation 301.

In operation 305, the electronic device uses the reflected lights to detect at least one object which exists in a neighboring area. For example, the electronic device may receive the lights reflected from the at least one object through an optic receiver (e.g., the optic receiver 220). In addition, the electronic device may use the reflected lights to detect the at least one object. For example, the electronic device may determine a round trip time (RTT) of the lights, determine distances to points at which the respective lights are reflected based on the RTTs, and estimate a shape and a distance to the at least one object based on the distances.

Figure 4:
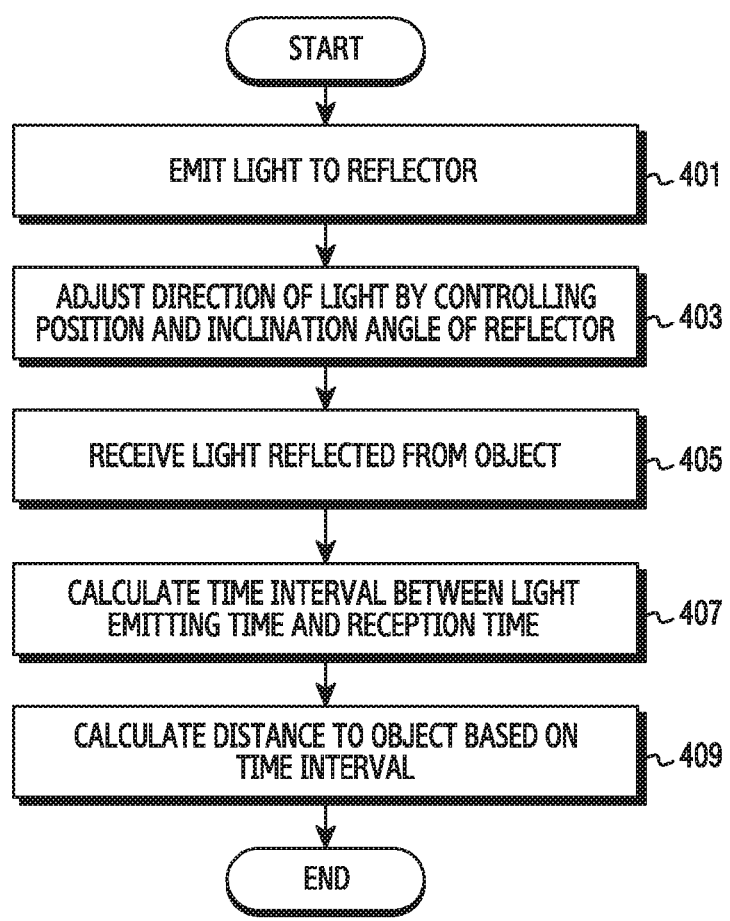
FIG. 4 is another flowchart illustrating an electronic device according to an embodiment of the present disclosure.

FIG. 4 is another flowchart illustrating an electronic device according to an embodiment of the present disclosure. A method of operating the electronic device 110 is exemplified in FIG. 4.

Referring to FIG. 4, in operation 401, the electronic device emits a light to a reflector (e.g., the reflector 230). In this case, a time of emitting the light is measured and recorded. In operation 403, the electronic device controls a position and inclination angle of the reflector to adjust a direction of the light. The electronic device may use an actuator (e.g., the actuator 250) to control the position and inclination angle of the reflector. In operation 405, the electronic device receives a light reflected from an object. In this case, the electronic device measures and records a time of receiving the light. In operation 407, the electronic device calculates a time interval between a time of emitting the light and a time of receiving the light based on the measured time. In operation 409, the electronic device calculates a distance to the object based on the calculated time interval.

As described above, the electronic device according to various embodiments may use the reflector to reflect the light, thereby freely adjusting the light. For this, the reflector is controlled to have an inclination of an intended direction and angle. In this case, the reflector may be controlled in various manners. According to one embodiment, the reflector may be controlled by a magnetic force, and in this case, the reflector may be referred to as a 'maglev reflector'. An embodiment of using the magnetic force is described below with reference to FIG. 5.

Figure 5A:
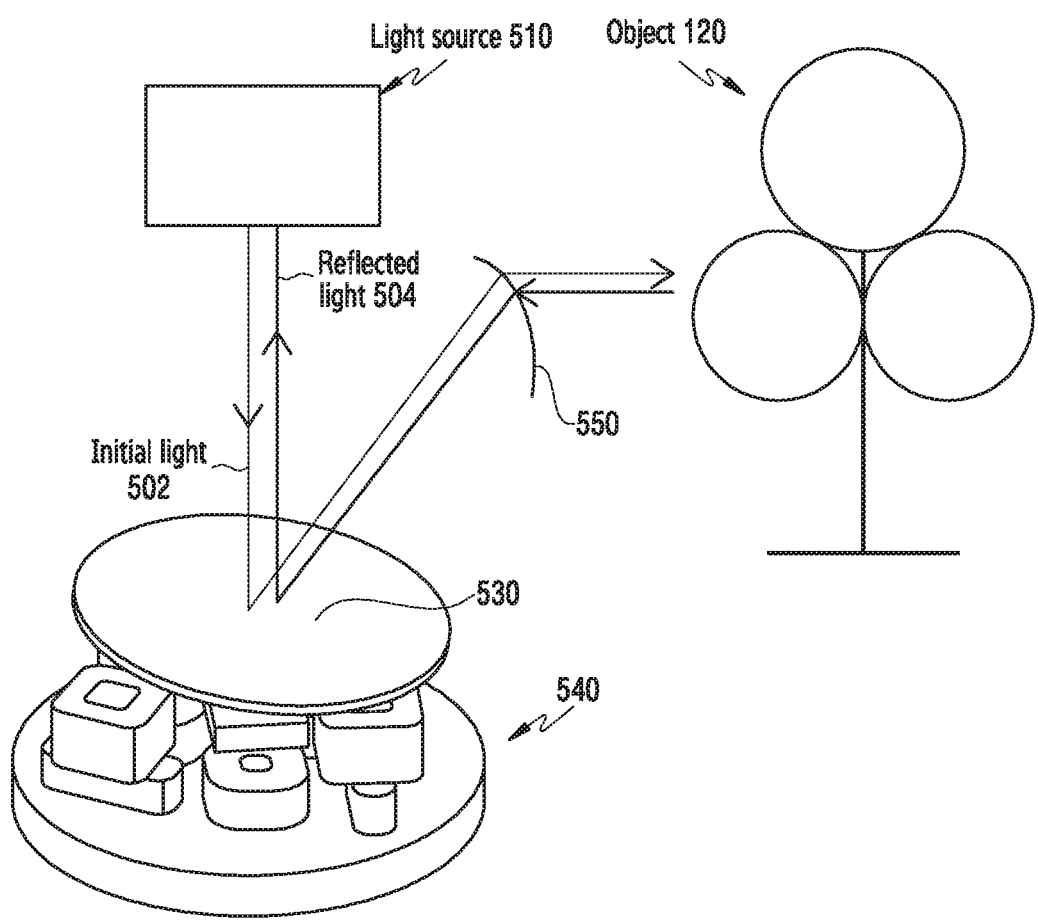
FIG. 5A illustrates a structure of an electronic device for controlling a reflector by using a magnetic force according to an embodiment of the present disclosure.

FIG. 5A illustrates a structure of an electronic device for controlling a reflector by using a magnetic force according to an embodiment of the present disclosure.

Referring to FIG. 5A, a light source 510 emits an initial light 502 that is reflected by a reflector 530 in different directions according to an inclination of the reflector 530. The inclination (or a position in free space) of the reflector 530 is controlled by a beam deflection device 540 corresponding to the actuator 250. According to an embodiment, a semi-spherical lens 550 may be used to redirect the light in a vertical plane, thereby facilitating to increase a scanning field-of-view in a vertical direction. The beam reflected 504 from the to-be-detected object 120 returns via the reflector 530.

In an embodiment, a receiver is located in proximity to the light source 510. Alternatively, the light source and the receiver may be integrated as a single unit. According to an embodiment, a laser is used as the light source 510. According to another embodiment, an LED may be used as the light source 510. Other suitable light sources may also be used depending on desired light characteristics. In an embodiment, an avalanche photodiode may be used as the receiver. The maglev reflector 530 according to the present disclosure may provide a possibility of a 6-degrees of freedom (DoF) control at a position of the reflector.

Figure 5B:
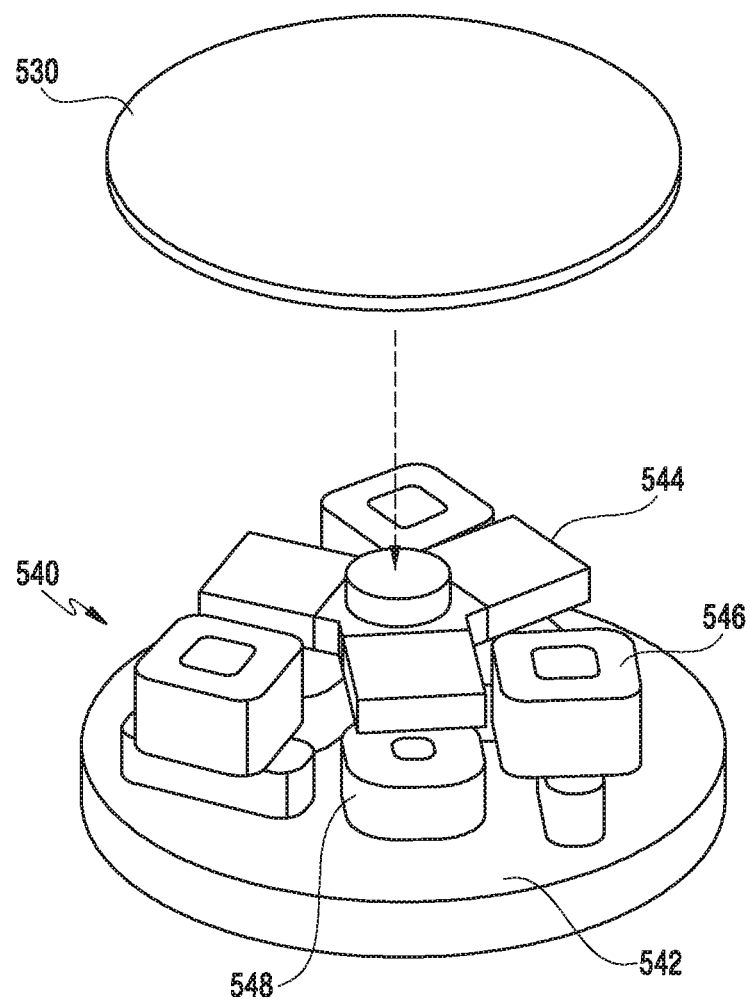
FIG. 5B illustrates a reflector and a beam deflection device in an electronic device according to an embodiment of the present disclosure.

FIG. 5B illustrates a reflector and a beam deflection device in an electronic device according to an embodiment of the present disclosure.

Referring to FIG. 5B, a beam deflection device 540 includes a base 542, permanent magnets 544, a maglev reflector 530 attached to the permanent magnets 544, and control coils 546 and 548 mounted on the base 542.

The base 542 may be made of aluminum. In addition, the base 542 may be made of magnesium. The base of a suitable paramagnetic material may be used depending on structural (weight, durability etc.) and economic requirements.

A position of every permanent magnet 544 in the space is defined by an electromagnetic interaction between the permanent magnets 544 and the control coils 546 and 548 to which current is supplied. Three permanent magnets are included in the embodiment of FIG. 5A. Three is the minimum number of magnets used for an operation of the electronic device. However, four or more permanent magnets may be used depending on a particular implementation. The maximum number of permanent magnets may be limited by a size and requirement of the electronic device.

The maglev reflector 530 may be attached to the permanent magnets 544 through a carrier element for permanent magnets. The dashed line with arrow in the figure indicates the attachment of the maglev reflector 530 through the carrier element for permanent magnets. The maglev reflector 530 is rigidly fixed to the carrier element. The attachment may be implemented by sticking, threaded connection, or another suitable attachment means. The carrier element for permanent magnets is made of a paramagnetic material. A top side of the maglev reflector 530 is covered by a material that can reflect a light. For example, the material may be one of silver, anodized aluminum, and another suitable material.

The control coils 546 and 548 include Horizontal (H)-control coils 546 defining a position of the maglev reflector 530 in a horizontal direction and Vertical (V)-control coils 548 defining a position of the maglev reflector 530 in a vertical direction. The control coils 546 and 548 are substantially electromagnets.

Figure 6:
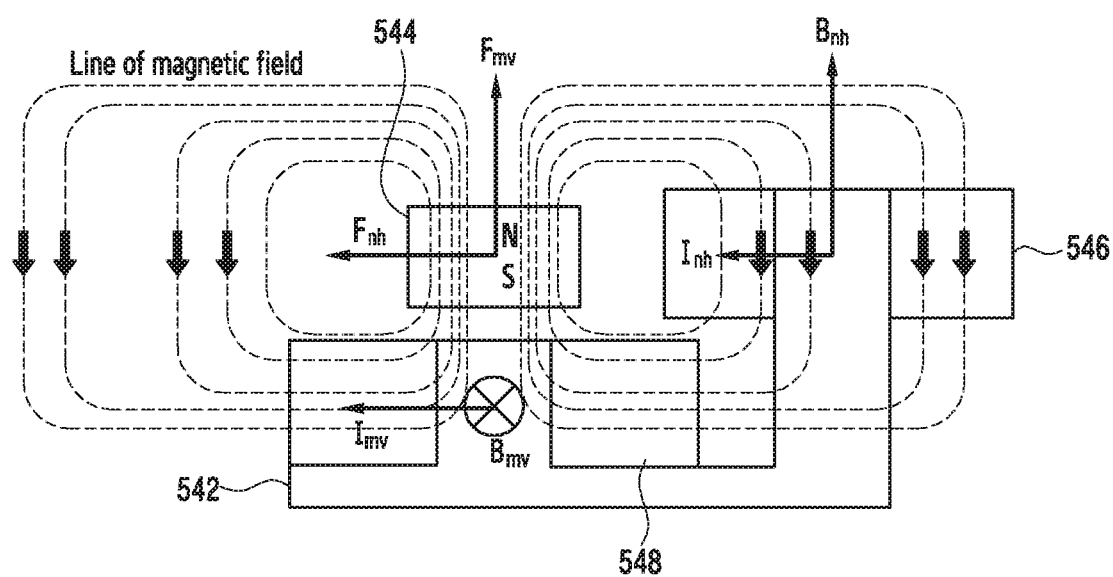
FIG. 6 is a cross-sectional view illustrating a suspension according to an embodiment of the present disclosure.

FIG. 6 is a cross-sectional view illustrating a suspension according to an embodiment of the present disclosure.

Referring FIG. 6, H-control coils 546 and V-control coils 548, depending on supplied direct current $I_{nh}$ (for H-control coil) and $I_{mv}$ (for V-control coil), can increase or decrease forces $F_{nh}$ and $F_{mv}$ correspondingly and define a position of magnet in horizontal and vertical direction, wherein n is changed from 1 to N, where N is the number of H-control coils, and m is changed from 1 to M, where M is the number of V-control coils. As shown in FIG. 6, according to right-hand screw rule V-control coil 548 when supplied by the direct current influences on the magnet 544 in vertical direction, and H-control coil 546 when supplied by the direct current influences on the magnet 544 in horizontal direction due to interaction of magnetic fields of the magnet 544 and control coils.

In vertical direction the position of magnet is defined by the vector sum of $F_{mv}$ force and gravity force applied to magnet. Since the force $F_{mv}$ is proportional to the current of the corresponding V-control coil 548 and inversely proportional to the distance between the permanent magnet 544 and the coil, increase or decrease of the current leads to movement of the permanent magnet relative to the V-control coil 548. Increase of the current leads to moving the magnet 544 away from the V-control coil 548, and decrease of the current leads to moving the magnet 544 towards the V-control coil 548. When the magnet 544 is raised the current of the V-control coil 548 shall be increased in order to keep the magnet 544 at the raised position.

It is possible to set the inclination angle of the reflector 530 in any direction by controlling altitude of three points of the reflector 530. Maximum inclination angle is defined by a construction and power requirements of the electronic device.

In horizontal direction the position of magnet is defined by the mutual compensation of the forces $F_{nh}$ distributed along cross-section of H-control coils 546 and their moments.

In horizontal direction the position of magnet is defined by the mutual compensation of the forces $F_{nh}$ distributed along cross-section of H-control coils 546 and their moments.

Figure 7A:
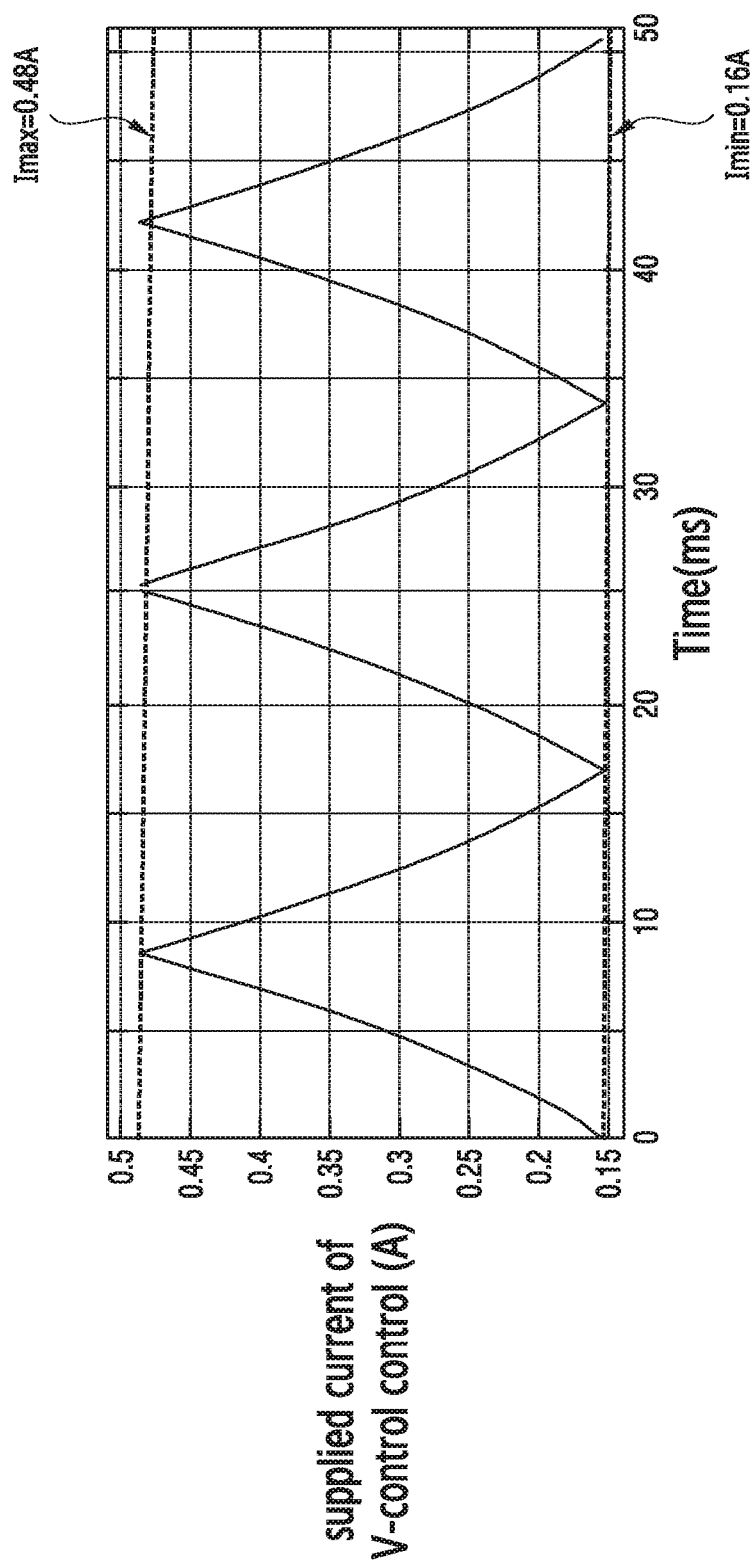
FIG. 7A is a graph illustrating supplied current of a vertical (V)-control coil over time according to an embodiment of the present disclosure.

FIG. 7A is a graph illustrating supplied current of a V-control coil over time according to an embodiment of the present disclosure.

The graph of FIG. 7A is illustrated for explanation. Other embodiments of the graph may be used within the scope of the present disclosure. In the graph, the current has a shape corresponding to a rotation of the reflector 530 about an axis. A force $F_{mv}$ is in proportion to current of the V-control coil 548 and an increase/decrease of the current leads to a movement of the permanent magnet 544 for the V-control coil 548. Therefore, in the graph, $I_{max}(=0.48\text{ A})$ implies current supplied to the V-control coil when the permanent magnet 544 corresponds to a maximum inclination angle, and $I_{min}(=0.16\text{ A})$ implies current supplied to the V-control coil when the permanent magnetic 544 corresponds to a minimum inclination angle.

Figure 7B:
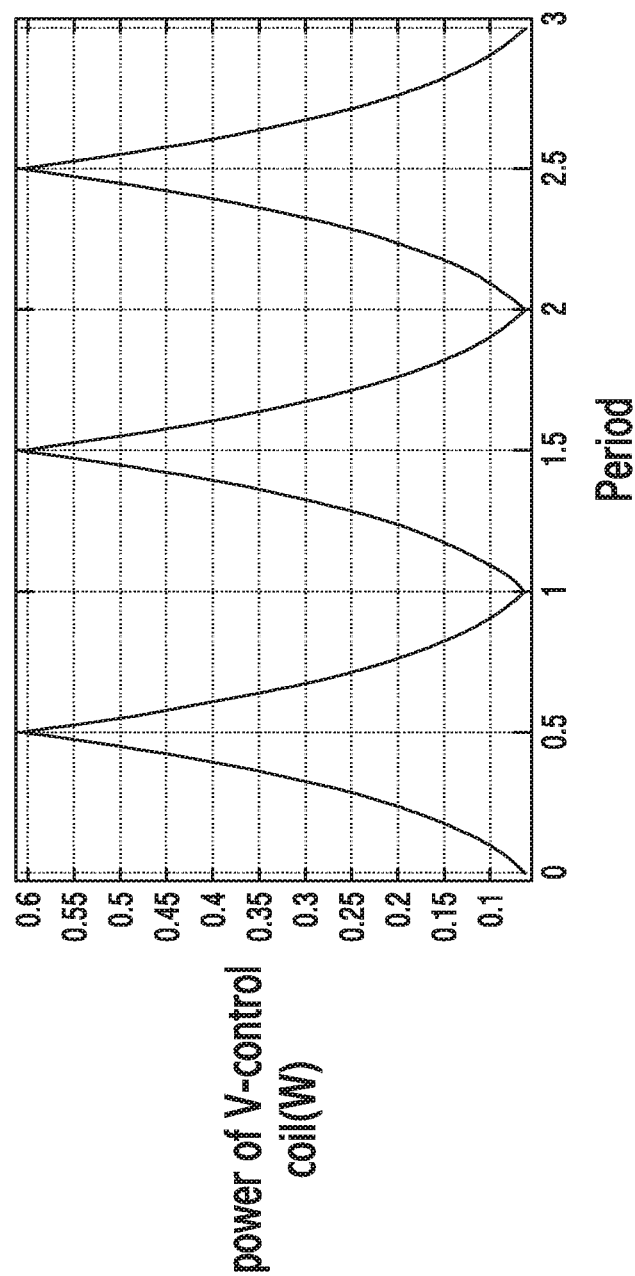
FIG. 7B is a graph illustrating supplied current of a V-control coil depending on a typical period according to an embodiment of the present disclosure.

FIG. 7B is a graph illustrating supplied current of a V-control coil depending on a typical period according to an embodiment of the present disclosure.

The graph of FIG. 7B is illustrated for explanation. Other embodiments of the graph may be used within the scope of the present disclosure. In the graph, power has a shape corresponding to a rotation of the reflector 530 about an axis, and the period represents a rotation period of the reflector 530. The power is measured through an internal resistor of the V-control coil. During one period, one V-control coil consumes power of 0.3 W on average, and three V-control coils consume power of 0.9 W on average.

Figure 8:
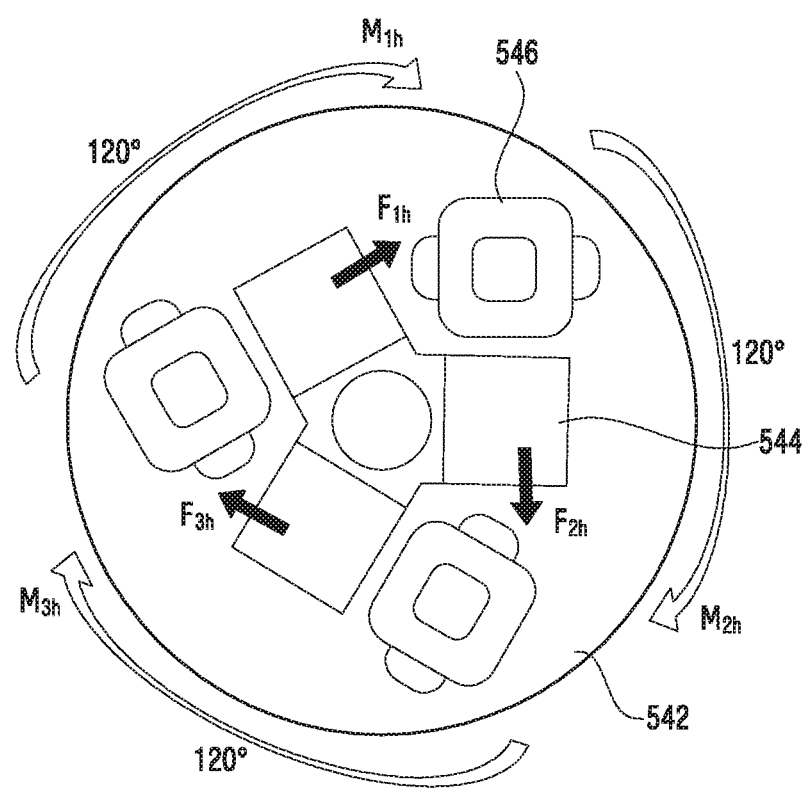
FIG. 8 is a plan view illustrating a stabilization environment in a horizontal direction according to an embodiment of the present disclosure.

FIG. 8 is a plan view illustrating a stabilization environment in a horizontal direction according to an embodiment of the present disclosure.

Referring to FIG. 8, forces $F_{1h}$, $F_{2h}$, and $F_{3h}$ are directed in a clockwise direction to define a principle of interaction between the permanent magnets 544 and the H-control coils 546. However, the forces $F_{1h}$, $F_{2h}$, and $F_{3h}$ may be directed in different directions and have different values depending on current supplied to the control coils 546 and 548 interacted with the permanent magnets 544 so as to compensate the forces $F_{1h}$, $F_{2h}$, and $F_{3h}$ and their moments $M_{1h}$, $M_{2h}$, and $M_{3h}$. Therefore, a position and inclination angle of the maglev reflector 530 may be defined by controlling the current supplied to control coils 546 and 548.

Direct current is supplied to the control coils 546 and 548. In case of interruption of the current supplied to the control coils 546 and 548, the maglev reflector 530 will be pulled down on the coils 546 and 548 mounted on the base 542 due to influence of gravity. According to an embodiment, the maglev reflector 530 may be pulled down on a special support(s) (not shown) provided on the base 542. In case of restoration of the current supplied to the control coils 546 and 548, the maglev reflector 530 will levitate again.

A direction of the force $F_{nh}$ is defined by the right-hand rule with vectors $B_{nh}$ and $I_{nh}$, where $B_{nh}$ is a magnetic field vector of an $n^{th}$ H-control coil. A direction of the force $F_{mv}$ is defined by the right-hand rule with vectors $B_{mv}$ and $I_{mv}$, where $B_{mv}$ is a magnetic field vector of an $m^{th}$ V-controlcoil. In a vertical direction, $F_{mv}$ is balanced with gravity. In the present embodiment, the electronic device in a horizontal direction is balanced by mutual compensation of the forces $F_{1h}$, $F_{2h}$, and $F_{3h}$ and their moments $M_{1h}$, $M_{2h}$, and $M_{3h}$ as shown in FIG. 8.

According to an embodiment, the reflector may have no mechanical connection with other elements of the electronic device due to magnetic levitation. A 2D scanning possibility is further provided by using 1 (single) channel including one light source and one receiver.

Figure 9A:
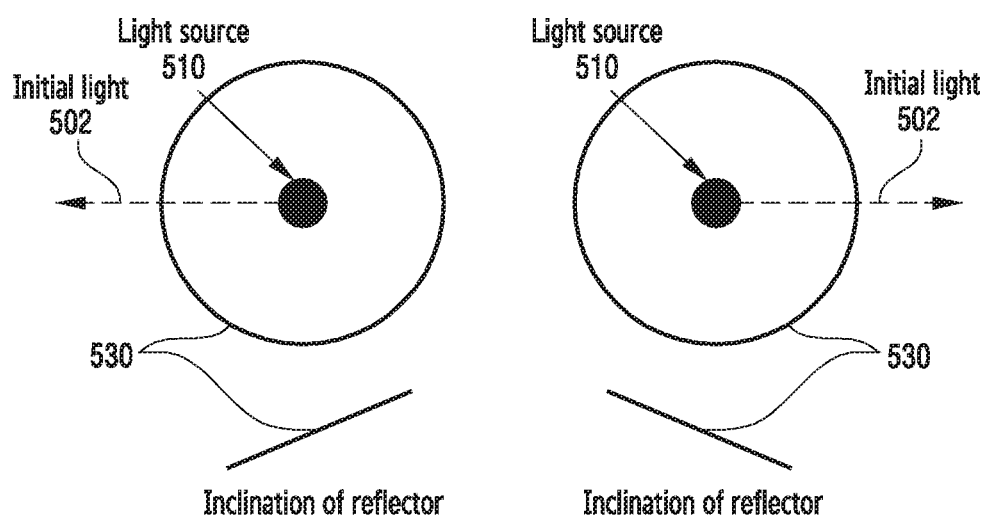
FIG. 9A illustrates a scanning operation of a horizontal plane in an electronic device based on a maglev reflector according to an embodiment of the present disclosure.
Figure 9B:
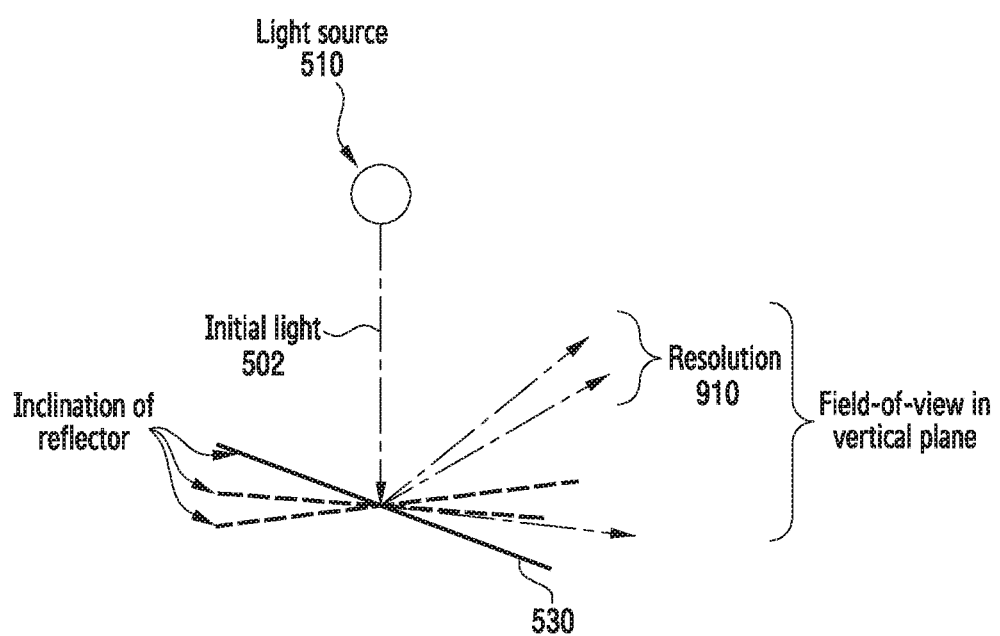
FIG. 9B illustrates a scanning operation of a vertical plane in an electronic device based on a maglev reflector according to an embodiment of the present disclosure.

FIG. 9A illustrates a scanning operation of a horizontal plane in an electronic device based on a maglev reflector according to an embodiment of the present disclosure. FIG. 9B illustrates a scanning operation of a vertical plane in an electronic device based on a maglev reflector according to an embodiment of the present disclosure.

As shown in FIG. 9A and FIG. 9B, a scanning control in horizontal and vertical planes is provided by controlling an inclination angle of the reflector 530. It is possible to control the inclination angle of the reflector 530 by controlling current in different control coils.

As shown in FIG. 9A, a balance of the electronic device in a horizontal plane is provided by H-control coils. A continuous control of the inclination of the reflector 530 may allow an initial light emitted from the light source 502 to rotate on the horizontal plane. Therefore, it is possible to scan each angular sector and to control a width of the sector.

As shown in FIG. 9B, the less the current of the V-control coil, the less the inclination angle (deflection from the horizontal plane) of the reflector 530 in proximity to the control coil, and vice versa. Therefore, it is possible to set any inclination angle of the reflector 530 in proximity to three V-control coils by controlling different current values of the control coils. Accordingly, the position is provided. An angle resolution 910 in the vertical plane is defined by current supplied to the control coils.

According to the aforementioned various embodiments, a LiDAR scanning device may be implemented in a form of a compact device. In addition, various embodiments provide an electronic (adaptive) control for the LiDAR scanning device and a self-calibration possibility. In addition, according to various embodiments, the LiDAR scanning device may dynamically change a field-of-view and an angle resolution. In addition, the LiDAR scanning device according to various embodiments may provide a vibration resistance of the maglev reflector up to 10 g (g is gravity acceleration). In addition, various embodiments decrease power consumption in the LiDAR scanning device.

Another embodiment of the present disclosure proposes a fully electronic (adaptive) control for a scanning device and a self-calibration possibility. Self-calibration may be needed after planned or unplanned power turn-off. Adaptive control is provided at every position of a beam deflection device.

The electronic device according to the aforementioned various embodiment may adaptively adjust a scanning range and a resolution by using the reflector. Accordingly, scanning suitable for a situation may be performed. That is, the electronic device according to various embodiments may be used in various scenarios. For example, the electronic device according to various embodiments may be used to detect objects (obstacles and moving vehicles) when driving a car. The electronic device according to various embodiments are advantageously used in an autonomous ground vehicles. In addition, the electronic device according to various embodiments may be used in navigation based on a 3-dimension (3D) scanning map to control service robots.

According to one embodiment, the electronic device may adjust the scanning range and the resolution for more specific scanning in a situation where a specific object of interest is discovered. For example, in the presence of the object, the electronic device may increase an angle resolution for a direction of the object of interest. Alternatively, in case of long-distance scanning, the electronic device may reduce a field-of-view and increase the angle resolution. Alternatively, in case of short-distance scanning, the electronic device may expand the filed-of-view and decrease the angle resolution.

Figure 10:
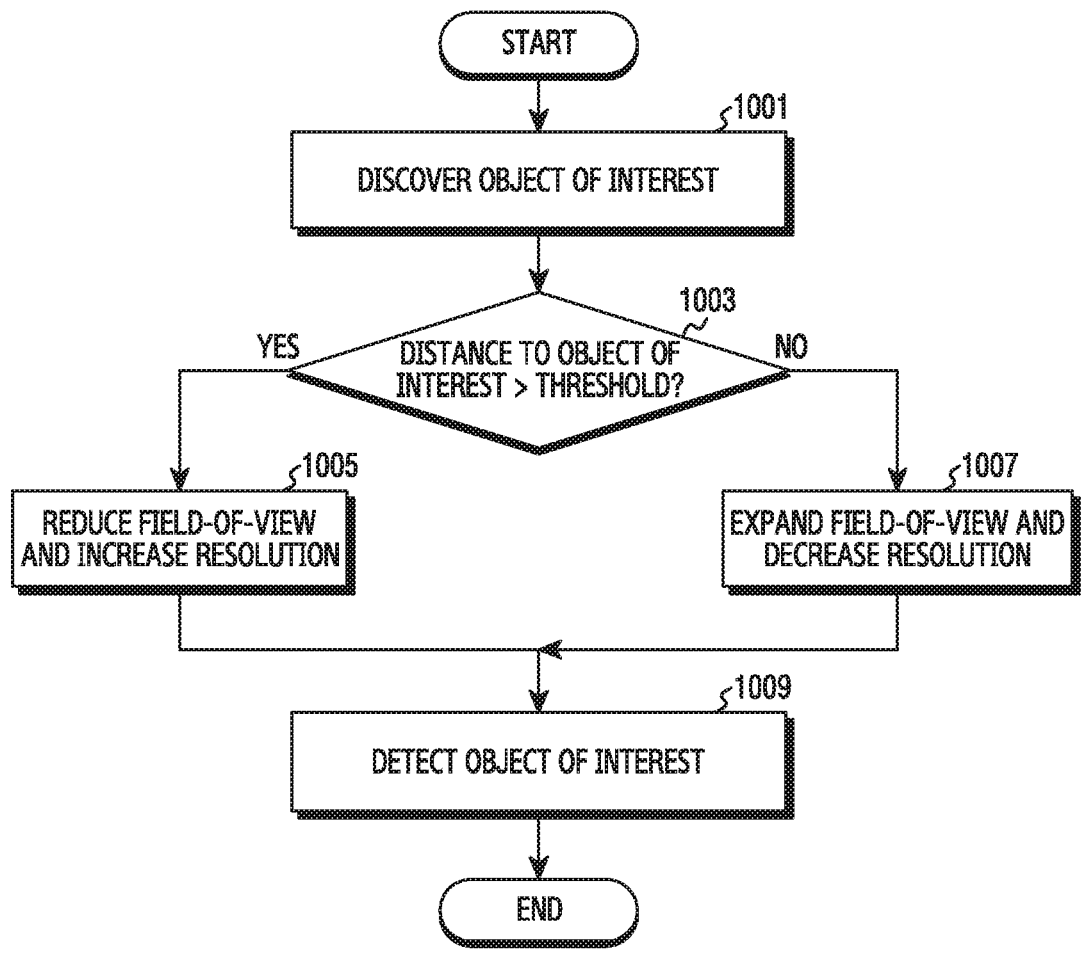
FIG. 10 is a flowchart illustrating a fully adaptive control for an electronic device according to an embodiment of the present disclosure.

FIG. 10 is a flowchart illustrating a fully adaptive control for an electronic device according to an embodiment of the present disclosure. Operations in a situation where an object of interest is discovered are exemplified in FIG. 10 as a method of operating the electronic device 100.

Referring to FIG. 10, in operation 1001, the electronic device discovers the object of interest. For example, the electronic device may determine whether there are the object of interest and an object having a similar shape and size greater than or equal to a specific level among objects detected through a scanning operation. That is, the electronic device has specific information stored therein and including at least one of a size and shape of an object defined as the object of interest, and may examine a likelihood with respect to the object detected through the scanning operation.

In operation 1003, the electronic device determines whether a distance to the object of interest is greater than a predefined threshold distance. Herein, the threshold distance may be predefined as a value for identifying a long distance and a short distance.

If the distance to the object of interest is greater than the threshold distance, in operation 1005, the electronic device reduces a field-of-view and increases a resolution. That is, the electronic device may reduce the field-of-view with respect to a direction towards the object of interest. For example, the electronic device may decrease a maximum inclination angle of permanent magnets by decreasing a range of adjusting a value of current supplied to at least one of V-control coils, thereby reducing the field-of-view and increasing the angle resolution.

On the other hand, if the distance to the object of interest is less than or equal to the threshold distance, in operation 1007, the electronic device expands the field-of-view and reduces the resolution. That is, the electronic device may expand the field-of-view with respect to the direction towards the object of interest. For example, the electronic device may increase a maximum inclination angle of permanent magnets by increasing a range of adjusting a value of current supplied to at least one of V-control coils, thereby expanding the field-of-view and reducing the angle resolution.

In operation 1009, the electronic device detects the object of interest. That is, the electronic device may emit lights according to the field-of-view and resolution adjusted in operation 1005 or operation 1007, and may use the reflected lights to scan the object of interest in greater detail. For example, the electronic device may adjust an inclination angle of a reflector according to the adjusted field-of-view and resolution by controlling values of current applied to the control coils.

According to another embodiment, the electronic device may adjust a scanning range and a resolution depending on a part of an allocated range in the entire scanning range. For example, a method for coordinating a plurality of scanning devices disposed to a specific apparatus (e.g., a vehicle) may be applied. The scheme of coordinating the plurality of scanning devices may be referred to as a 'scanning pattern control' or 'scanning scheduling'. If the plurality of scanning devices are disposed to different lateral sides of the vehicle, a field-of-view of each scanning device may be controlled to cover an observation region in the vehicle.

Figure 11:
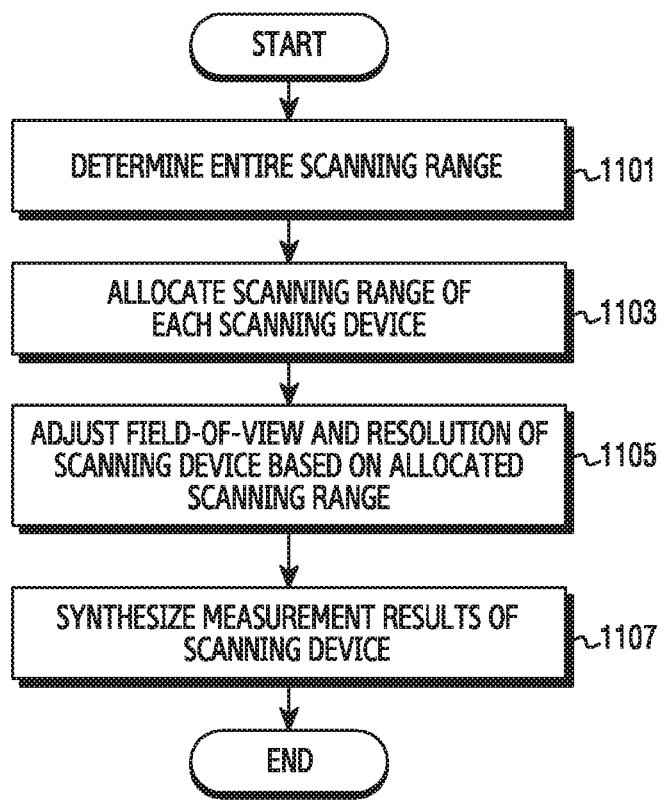
FIG. 11 is a flowchart illustrating a coordination of a plurality of scanning devices disposed to an apparatus according to an embodiment of the present disclosure.

FIG. 11 is a flowchart illustrating a coordination of a plurality of scanning devices disposed to an apparatus according to an embodiment of the present disclosure.

For a procedure of FIG. 11, a separate coordinating device for coordinating the plurality of scanning devices may be used, or one of the plurality of scanning devices may control other scanning devices. Hereinafter, although the coordinating device is exemplified as an operational entity for convenience of explanation, similar operations may be performed by one of the scanning devices.

Referring to FIG. 11, in operation 1101, the coordinating device determines the entire scanning range. That is, the coordinating device determines a specific side and a specific range in which scanning will be performed by the plurality of scanning devices disposed to an apparatus (e.g., a vehicle).

In operation 1103, the coordinating device allocates the scanning range to each of the plurality of scanning devices. That is, the electronic device may divide the entire scanning range determined in operation 1101 to allocate it to each of the scanning devices, so as to detect a range to which one scanning device is allocated. In this case, the scanning range of each scanning device may partially overlap. In addition, the coordinating device may further determine a resolution of each scanning device.

In operation 1105, the coordinating device adjusts a field-of-view and angle resolution of each scanning device based on the allocated scanning range. For this, the coordinating device may provide information indicating at least one of the scanning range and the resolution to each scanning device.

In operation 1107, the coordinating device synthesizes scanning results based on the respective scanning devices. Accordingly, the coordinating device may acquire the synthesized scanning result for a surrounding environment of the apparatus. For example, the coordinating device may generate a 3D scanning map based on collected data.

Figure 12:
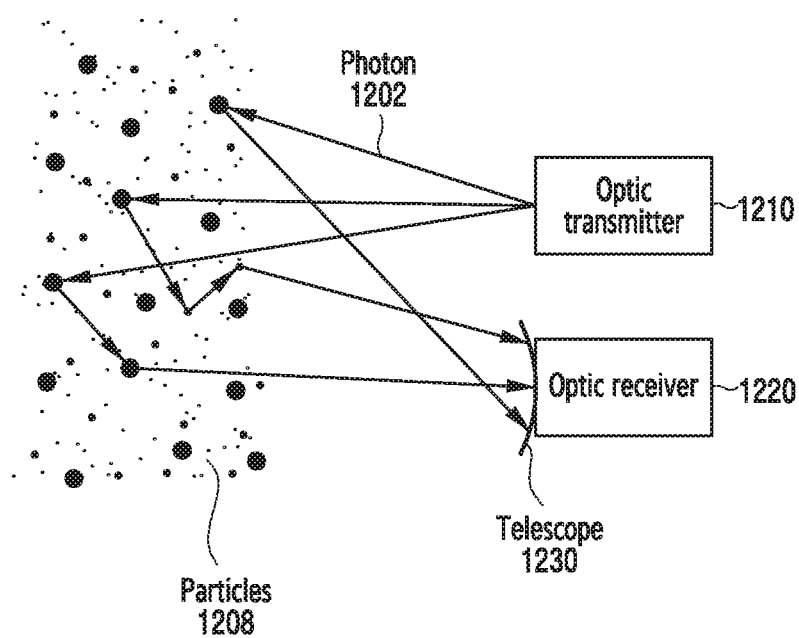
FIG. 12 illustrates the concept of light detection and ranging (LiDAR) for atmospheric measurement according to an embodiment of the present disclosure.

FIG. 12 illustrates the concept of LiDAR for atmospheric measurement according to an embodiment of the present disclosure. A scanning technique according to various embodiments may be used to estimate particle density.

As shown in FIG. 12, a photon 1202 transmitted from an optic transmitter 1210 is reflected from particles (e.g., aerosols or molecules) 1208 in the air, and thereafter is received by an optic receiver 1220. Photons 1202 received by the receiver 1220 are collected by a telescope 1230. In this case, how long distance the photons 1202 reciprocate may be calculated based on the speed of light (~3×10$^8$ m/s). An embodiment regarding scanning on the particles 1208 is described below with reference to FIG. 13.

Figure 13:
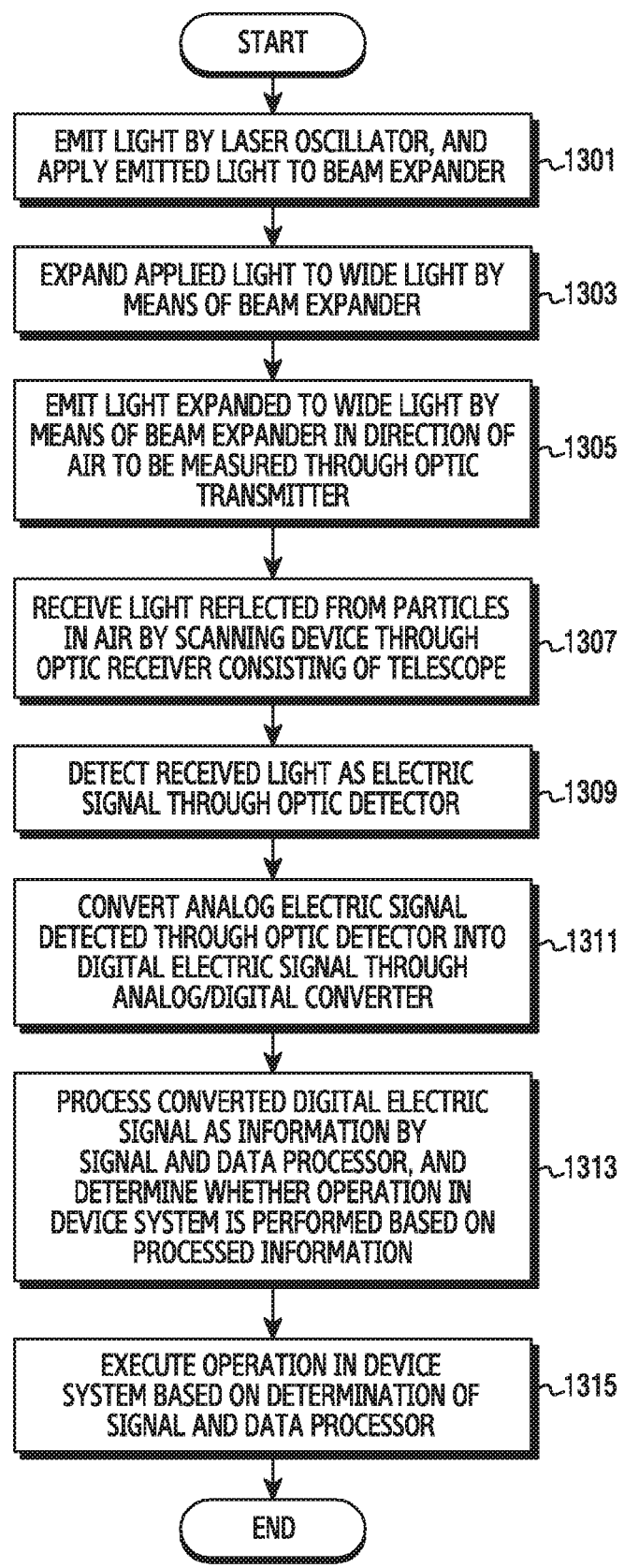
FIG. 13 is a flowchart illustrating an atmospheric measurement service based on LiDAR according to an embodiment of the present disclosure.

FIG. 13 is a flowchart illustrating an atmospheric measurement service based on LiDAR according to an embodiment of the present disclosure.

A method of operating an electronic device is exemplified in FIG. 13. Referring to FIG. 13, in operation 1301, a laser oscillator emits a light, and the emitted light is applied to a beam expander. In operation 1303, the applied light is expanded to a wide light by means of the beam expander for optimized scanning. The beam expander may consist of two pairs of lenses having the same focal position. In operation 1305, the light expanded to the wide light by the beam expander is emitted in a direction of the air to be measured through the optic transmitter. The emitted light is scattered in several directions by being collided with particles in the air. In operation 1307, the light reflected from the particles in the air is received by the scanning device through the optic receiver consisting of a telescope. The light may be more effectively received through the telescope. In operation 1309, the received light is detected as an electric signal through an optic detector. The optic detector is configured to convert an optical signal into an electric signal, and an avalanche photodiode may be used. In operation 1311, an analog electric signal is converted into a digital electric signal through an analog/digital converter for more effective signal processing (e.g., storing, convenience in manipulation, noise, etc.). In operation 1313, a signal and data processor processes the converted digital electric signal as information, and determines whether an operation in a device system is performed based on the processed information. In operation 1315, an operation (e.g., opening/closing a vehicle door, controlling an air conditioner) in the device system is performed based on the determination of the signal and data processor.

Figure 14A:
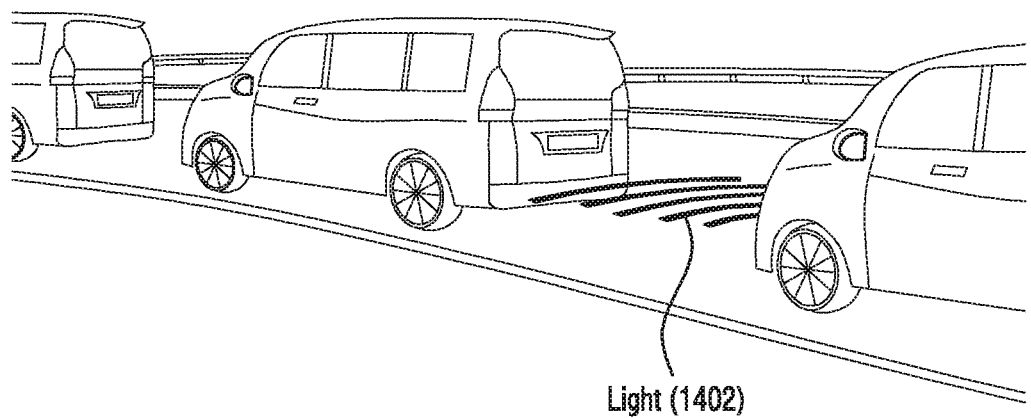
FIGS. 14A and 14B illustrate examples of detecting an object on a car according to various embodiments of the present disclosure.
Figure 14B:
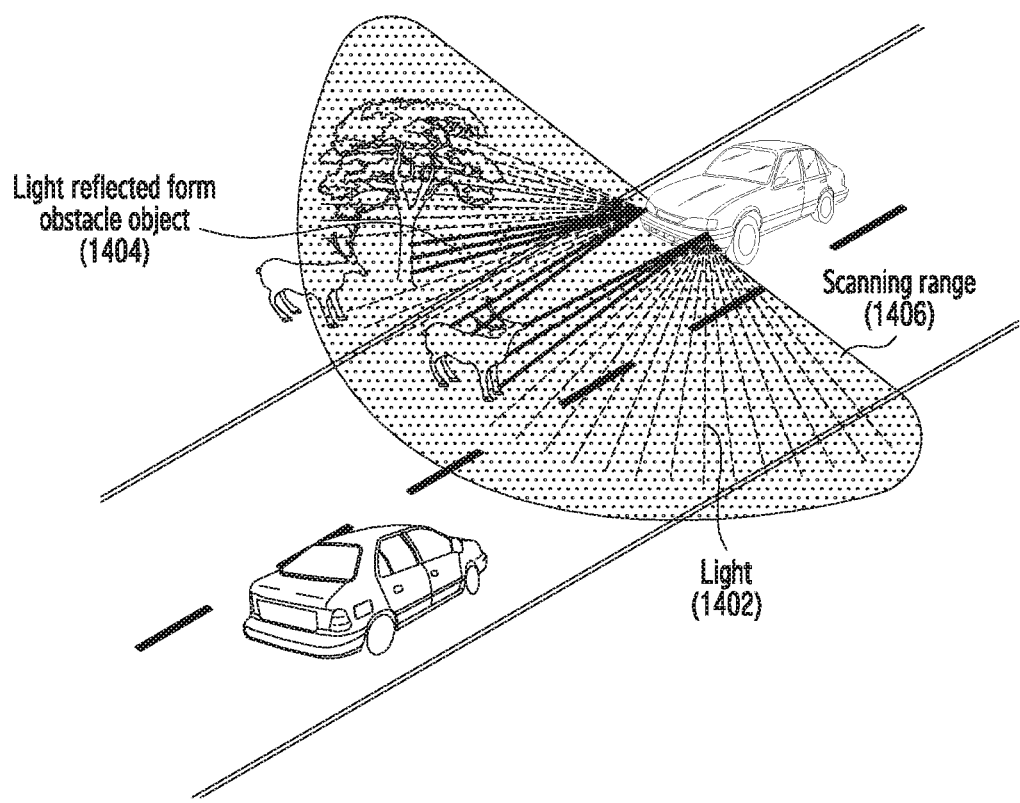

FIGS. 14A and 14B illustrate examples of detecting an object on a car according to various embodiments of the present disclosure. The present disclosure is used to detect objects such as obstacles and moving vehicles when driving a car.

As shown in FIG. 14A, the present disclosure can detect a preceding car by using an emitted light 1402, thereby avoiding a collision with the preceding car and sensing a lane or the like. As shown in FIG. 14B, the present disclosure may use the emitted light 1402 and receive a light 1404 reflected from an obstructive object in a scanning range 1406 to detect an obstructive object or the like. Therefore, the present disclosure is advantageously used in an autonomous ground vehicle.

Figure 15A:
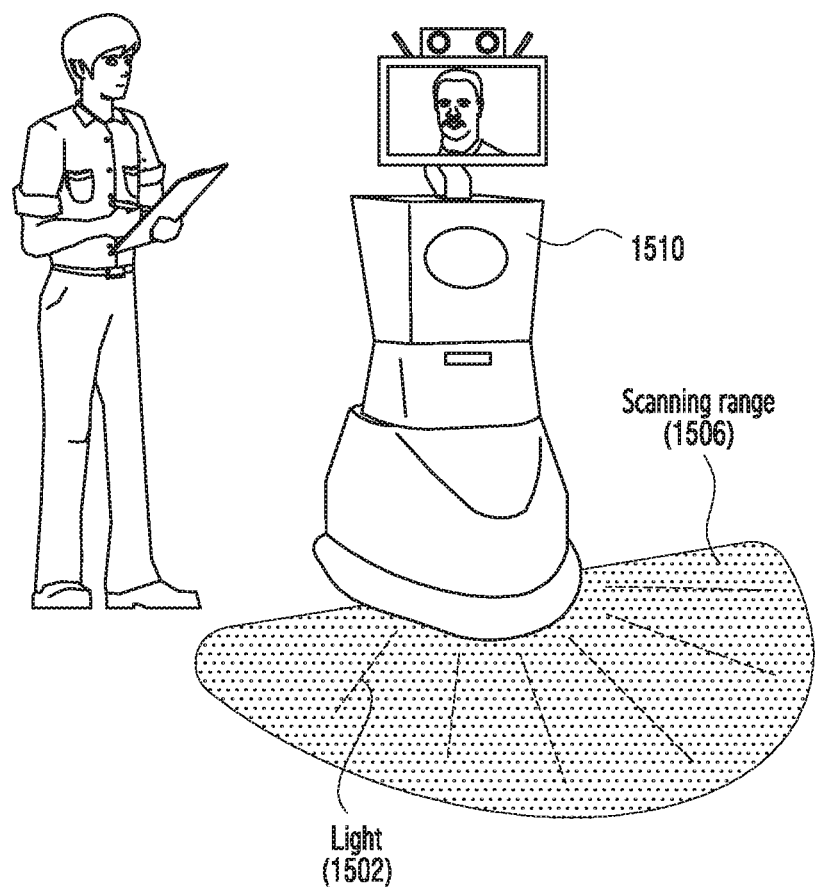
FIG. 15A illustrates an example of a service robot controlled by a navigation based on a 3-dimension (3D) scanning map according to an embodiment of the present disclosure.
Figure 15B:
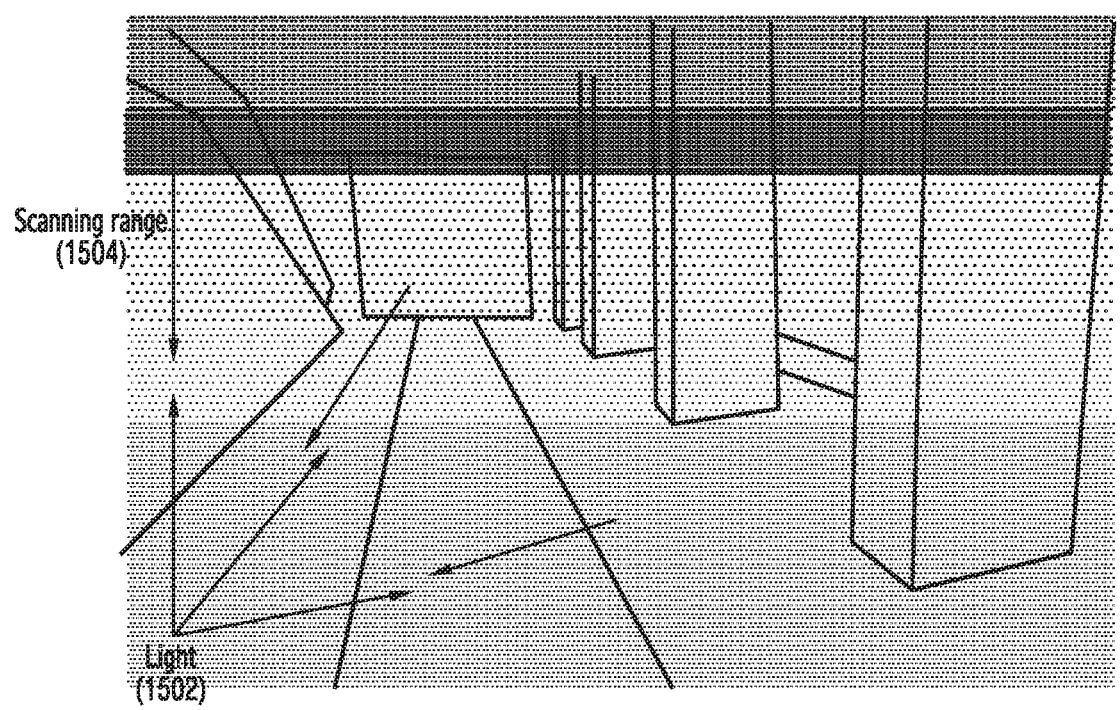
FIG. 15B illustrates an example of a 3D scanning map according to an embodiment of the present disclosure.

FIG. 15A illustrates an example of a service robot controlled by a navigation based on a 3D scanning map according to an embodiment of the present disclosure. FIG. 15B illustrates an example of a 3D scanning map according to an embodiment of the present disclosure.

The present disclosure may be used in a navigation based on a 3D scanning map for controlling service robots (e.g., personal service robots for healthcare, cooking, or the like). An example of a personal service robot 1510 for healthcare is illustrated in FIG. 15A. The service robot 1510 uses a scanning device of the present disclosure to emit the light 1502, and performs 3D scanning of a scanning range 1506. As shown in FIG. 15B, the scanning device of the service robots emits the light 1502 and receives a light 1504 reflected from an object to perform 3D scanning, and creates a 3D scanning map. The service robots may be controlled through the navigation based on the 3D scanning map.

In a method and an electronic device according to various embodiments of the present disclosure, a light for detecting an object is controlled by using a reflector, thereby being able to detect the object by using a small number of light sources and being able to provide a long lifespan of the device.

Methods based on the embodiments disclosed in the claims and/or specification of the present disclosure can be implemented in hardware, software, or a combination of both.

When implemented in software, a non-transitory computer readable recording medium for storing one or more programs (i.e., software modules) can be provided. The one or more programs stored in the non-transitory computer readable recording medium are configured for execution performed by one or more processors in the electronic device. The one or more programs include instructions for allowing the electronic device to execute the methods based on the embodiments disclosed in the claims and/or specification of the present disclosure.

The program (i.e., the software module or software) can be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device can have an access to a device for performing an embodiment of the present disclosure via an external port. In addition, an additional storage device on a communication network can have an access to the device for performing the embodiment of the present disclosure.

In the aforementioned specific embodiments of the present disclosure, a constitutional element included in the disclosure is expressed in a singular or plural form according to the specific example embodiment proposed herein. However, the singular or plural expression is selected properly for a situation proposed for the convenience of explanation, and thus the various embodiments of the present disclosure are not limited to a single or a plurality of constitutional elements. Therefore, a constitutional element expressed in a plural form can also be expressed in a singular form, or vice versa.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a transmitter (210) configured to emit light beams;
   a reflector (230) configured to reflect the light beams;
   an actuator (250) comprising a base (542), and control coils (546, 548) disposed on the base configured to steer the light beams towards an external object by controlling a direction and angle of an inclination of the reflector;
   a receiver (220) configured to receive the light beams reflected from the external object through the reflector; and
   at least one processor (260) configured to detect the external object by using the received reflected light beams,
   wherein reflector is levitated from the actuator by an electromagnetic interaction of a permanent magnet that is attached to the reflector and the control coils included in the actuator, and
   wherein the control coils comprise:
      a plurality of horizontal-control coils configured to control a position of the reflector in a horizontal direction, and
      a plurality of vertical-control coils configured to control a position of the reflector in a vertical direction.

2. The electronic device of claim 1, further comprising:
   a lens (550) configured to expand a scanning field-of-view.

3. The electronic device of claim 1, wherein the at least one processor is further configured to measure a distance to the external object based on a time interval between a time of emitting the light beam and a time of receiving the reflected light beam.

4. The electronic device of claim 1, wherein the at least one processor is further configured to:
   determine a scanning range and a resolution of the light beam; and
   control the actuator according to the scanning range and the resolution.

5. The electronic device of claim 4, wherein if the external object is a predefined object of interest, the at least one processor is further configured to determine again the scanning range and the resolution.

6. The electronic device of claim 5, wherein the at least one processor is further configured to expand or reduce the scanning range based on a distance to the predefined object of interest.

7. The electronic device of claim 4, wherein the at least one processor is further configured to:
   control to respectively allocate the scanning range to the electronic device and at least one different electronic device; and
   scan in the scanning range allocated to the electronic device.

8. The electronic device of claim 4, wherein the at least one processor is configured to:
   control to receive information regarding the scanning range allocated to the electronic device from another device, and
   scan in the scanning range allocated to the electronic device.

9. The electronic device of claim 1, wherein the receiver comprises an avalanche photodiode.

10. The electronic device of claim 1, wherein the transmitter comprises a laser transmitter or a light emitting diode (LED).

11. The electronic device of claim 1, wherein at least one side of the reflector is formed of silver or anodized aluminum.

12. A method performed by an electronic device, the method comprising:
    emitting, by a transmitter, light beams;
    steering, by an actuator comprising a base (542), and control coils (546, 548) disposed on the base, the light beams towards an external object by controlling a direction and angle of an inclination of a reflector;
    receiving, by a receiver, the light beams reflected from the external object through the reflector; and
    detecting, by at least one processor, the external object by using the received reflected light beams,
    wherein the reflector is levitated from the actuator by an electromagnetic interaction of permanent magnets that are attached to the reflector and the control coils included in the actuator, and
    wherein the control coils comprise:
       a plurality of horizontal-control coils configured to control a position of the reflector in a horizontal direction, and
       a plurality of vertical-control coils configured to control a position of the reflector in a vertical direction.

13. The method of claim 12, wherein the detecting of the external object comprises measuring a distance to the external object based on a time interval between a time of emitting the light beam and a time of receiving the reflected light beam.

14. The method of claim 12, further comprising:
   determining a scanning range and a resolution of the light beam; and
   controlling an actuator for controlling the reflector according to the scanning range and the resolution.

15. The method of claim 14, further comprising, if the external object is a predefined object of interest, determining again the scanning range and the resolution.

16. The method of claim 15, wherein the determining again the scanning range and the resolution comprises expanding or reducing the scanning range based on a distance to the predefined object of interest.

17. The method of claim 14, wherein the determining of the scanning range and the resolution comprises respectively allocating the scanning range to the electronic device and at least one different electronic device.

18. The method of claim 17, further comprising scanning in the scanning range allocated to the electronic device.

19. The method of claim 14, wherein the determining of the scanning range and the resolution comprises receiving information regarding the scanning range allocated to the electronic device from another device.

\* \* \* \* \*